United States Patent

Newman et al.

[11] Patent Number: 6,054,205
[45] Date of Patent: Apr. 25, 2000

[54] GLASS FIBER FACING SHEET AND METHOD OF MAKING SAME

[75] Inventors: Nicholas S. Newman, Cohasset, Mass.; Gordon L. Brown, Jr., Anderson, S.C.; R. Bruce Hinton, Anderson, S.C.; Andrew D. Broadway, Anderson, S.C.; Chia-Te Chou, Anderson, S.C.

[73] Assignee: Clark-Schwebel Tech-Fab Company, Anderson, S.C.

[21] Appl. No.: 08/865,603

[22] Filed: May 29, 1997

[51] Int. Cl.$^7$ ........................................ B32B 9/00
[52] U.S. Cl. .................. 428/221; 428/101; 428/109; 428/111; 428/113; 428/198; 428/219; 428/220; 428/295.1; 428/703; 442/17; 442/19; 442/50; 442/54; 264/171.1; 156/42; 156/181
[58] Field of Search ...................... 428/109, 101, 428/111, 703, 295.1, 113, 198, 219, 220, 221; 156/296, 181, 62.4, 42; 442/17, 19, 20, 50, 327, 54, 58, 66, 67, 103; 264/171.1

[56] References Cited

U.S. PATENT DOCUMENTS

| | | | |
|---|---|---|---|
| 2,902,395 | 9/1959 | Hirschy | 154/46 |
| 3,214,289 | 10/1965 | LeFebvre | 117/122 |
| 3,788,271 | 1/1974 | Carpenter et al. | 118/33 |
| 3,993,822 | 11/1976 | Knauf et al. | 428/213 |
| 4,048,364 | 9/1977 | Harding et al. . | |
| 4,064,306 | 12/1977 | Scothchmer et al. | 428/255 |
| 4,087,577 | 5/1978 | Hendrickson | 428/110 |
| 4,203,788 | 5/1980 | Clear | 156/44 |
| 4,242,779 | 1/1981 | Curinier et al. | 28/101 |
| 4,302,495 | 11/1981 | Marra | 428/110 |
| 4,340,558 | 7/1982 | Hendrickson | 264/151 |
| 4,491,617 | 1/1985 | O'Connor et al. | 428/236 |
| 4,504,335 | 3/1985 | Galer | 156/42 |
| 4,504,533 | 3/1985 | Altenhöfer et al. . | |
| 4,578,301 | 3/1986 | Currie et al. | 428/109 |
| 4,647,496 | 3/1987 | Lehnert et al. | 428/251 |
| 4,810,569 | 3/1989 | Lehnert | 428/285 |
| 4,910,064 | 3/1990 | Sabee | 428/109 |
| 5,139,841 | 8/1992 | Makoui et al. . | |
| 5,148,645 | 9/1992 | Lehnert et al. | 52/443 |
| 5,200,246 | 4/1993 | Sabee . | |
| 5,342,680 | 8/1994 | Randall | 428/285 |
| 5,350,554 | 9/1994 | Miller | 264/171 |
| 5,370,756 | 12/1994 | Buis et al. . | |
| 5,371,989 | 12/1994 | Lehnert et al. | 428/70 |
| 5,397,631 | 3/1995 | Green et al. | 428/219 |

FOREIGN PATENT DOCUMENTS

| | | |
|---|---|---|
| 0637658 A1 | 8/1995 | European Pat. Off. . |
| 30 12 293 | 10/1981 | Germany . |
| 2 102 731 | 2/1983 | United Kingdom . |

OTHER PUBLICATIONS

European Search Report, The Hague, Jan. 26, 1999.

*Primary Examiner*—Deborah Jones
*Assistant Examiner*—Abraham Bahta
*Attorney, Agent, or Firm*—Alston & Bird LLP

[57] ABSTRACT

The invention provides a glass fiber facing sheet for engineered surfaces such as cement boards which reduces the pitting associated with open mesh glass scrims. The glass fiber facing sheet comprises an open mesh glass scrim having a plurality of intersecting continuous multifilament yarns which are bonded at their crossover points to provide dimensional stability to the scrim. A melt blown polymer web is preferably joined to one face of the glass scrim and covers the mesh openings in the scrim. The opposed face of the scrim defines an exposed grid profile surface which is available for mechanical interaction between the scrim and the cementitious slurry used in cement boards. In cement boards, the glass fiber facing sheet of the present invention is preferably mechanically integrated into a surface portion of the cement core along the exposed grid profile of the scrim. A second facing sheet may also be mechanically integrated into an opposed surface portion of the cement core and contain a melt blown polymer web joined to one face. The present invention further includes a method of making the glass fiber facing sheet of the invention and a method of making a smooth cement board containing the glass fiber facing sheet of the invention.

36 Claims, 3 Drawing Sheets

GLASS FIBER FACING SHEET AND METHOD OF MAKING SAME

FIELD OF THE INVENTION

The invention relates to glass fiber facing sheets for cement boards and a method of making same, and more particularly, relates to nonwoven, open mesh facing sheets formed of continuous glass yarns, to a method of making same and to engineered surfaces, specifically, cement boards including such facing sheet material.

BACKGROUND OF THE INVENTION

Interior and exterior construction boards with cores of plaster, cement, or hybrid materials, such as cement boards or gypsum boards, are used in a wide variety of indoor and outdoor structural applications. For example, cement boards are used as a support surface for overlying materials such as wood siding, stucco, synthetic stucco, aluminum, brick, tile, stone aggregate and marble. In addition, cement boards are used in exterior insulating systems, commercial roof deck systems, and exterior curtain walls.

Generally, cement boards contain a core formed of a cementitious material which is interposed between two layers of facing material. The facing material advantageously contributes flexural and impact strength to the high compressive strength but brittle material forming the hardened cementitious core. In addition, the facing material can provide a durable surface and/or other desirable surface properties to the cement board.

One material which has been used to form facing sheet material is glass fibers. In addition to increased dimensional stability in the presence of moisture, glass fiber facings provide greater physical and mechanical properties to the cement board. As described, for example, in U.S. Pat. No. 5,371,989 to Lehnert et al., the method of making cement boards containing glass fiber facing sheets typically consists of providing a continuous feed of the facing material and depositing a cementitious slurry onto the top surface of the facing material. A second continuous feed of facing material is then applied to the top surface of the slurry. The slurry is then dried to harden the cementitious composition and to integrate the facing material in the cement board. The cement board is cut to a predetermined length for shipping and for its eventual use.

U.S. Pat. No. 4,647,496 to Lehnert et al. describes the use of randomly oriented fibrous glass mats as the facing material for gypsum boards. Additionally, U.S. Pat. No. 5,397,631 to Green et al. describes coating a gypsum board including a randomly oriented glass mat with a water-resistant resinous binder to prevent the deterioration of the bond between the gypsum and the glass mat.

An alternative to the randomly oriented fibrous glass mats to reinforce cement boards is the use of open mesh glass scrims formed from continuous glass yarns. Because these scrims contain continuous yarns, they possess greater tensile strength than the randomly oriented fibrous glass mats. For example, U.S. Pat. No. 3,993,882 to Knauf et al. describes using a facing sheet formed of a glass fabric. In addition, published European patent application 637,658 to Bay Mills Limited describes the use of glass rovings to form nonwoven scrims for stucco boards.

In order to reduce glass usage, the mesh size of the glass scrims may be increased thus reducing the number of yarns or "picks per inch" in the transverse and/or the longitudinal direction without reducing the strength of the cement board. Nevertheless, the resulting increase in the size of the mesh openings in the glass fiber facing sheet causes other problems. Particularly, when the open mesh facing is applied to a cementitious slurry, pitting or the formation of indentations may occur in the center of the mesh openings which negatively affects the aesthetic appearance and surface properties of the cement board.

SUMMARY OF THE INVENTION

The present invention provides a glass fiber facing sheet for engineered surfaces such as for masonry applications, roofing applications, and the like, preferably for cement board. The glass fiber facing sheet provides a smooth surface which is essentially free of pitting. The glass fiber facing sheet is created from a minimal amount of material compared to glass fiber facing sheets that use a heavier weight scrim, thus reducing the cost and weight of the resulting cement board or other product but without significant negative impact on the physical and mechanical properties of the final product.

In accordance with the present invention, the glass fiber facing sheet comprises an open mesh glass scrim having a plurality of intersecting glass yarns which are bonded at their crossover points to provide dimensional stability to the scrim. The glass scrim of the present invention is preferably a nonwoven scrim comprising generally transverse and generally longitudinal yarns having less than 100 mesh openings per square inch, i.e., less than 10 by 10 picks per inch. Preferably, the glass yarns are bonded through the use of a polymeric binder. A polymer web is joined to one or both faces of the glass scrim and covers at least a portion of the mesh openings in the scrim. The polymer web is formed of melt blown polymer fibers which are preferably formed directly on the surface of the scrim. The melt blown polymer web is generally a low strength web that does not contribute significantly to the strength of the cement board. Nevertheless, the polymer web causes a cementitious slurry or other liquid used to form cement board, roofing materials and the like, to window pane evenly over the mesh openings on the exterior of the scrim thus improving the appearance and, at least in some cases the strength of the final product, e.g., cement board, by improving the interaction of the liquid or slurry and the glass scrim. Because the melt blown web is typically thin and is normally applied to only one face of the glass scrim, the opposed face of the scrim provides an exposed three-dimensional grid profile surface which remains available to interact mechanically with hardenable liquids such as the cementitious slurry used in the cement board. Accordingly, when used in forming cement board, the glass fiber facing sheet of the present invention is mechanically integrated into a surface portion of the cementitious core by virtue of the exposed grid profile surface of the scrim. A second open mesh glass scrim may be mechanically integrated into the other surface of the cement core to further enhance the properties of the cement board and may also include a melt blown polymer web on the surface of the scrim.

In one preferred embodiment of the invention, the melt blown polymer web applied to the surface of the glass scrim has a basis weight of between about 2 and 30 g/m² (grams per square meters of scrim). Cement board formed using this facing sheet has a smooth exterior surface with little or no pitting. In another preferred embodiment of the invention, the melt blown polymer web applied to the surface of the open mesh glass scrim has a higher basis weight of between about 10 and 50 g/m². The basis weight of the melt blown polymer web in this embodiment provides various desirable surface properties including a smooth finished exterior surface which can be painted directly.

In yet another preferred embodiment of the invention, the melt blown polymer web applied to the surface of the glass scrim has an even higher basis weight of between about 45 and 75 g/m². The melt blown polymer web may then be subjected to heat and pressure to melt and coalesce the fibers in the polymer web to form a microporous layer. The microporous layer provides a water resistant surface which nonetheless allows gases such as water vapor to pass through the web. Alternatively, a microporous film such as a high density polyethylene film may be applied to the facing sheet prior to or following deposition of the melt blown polymer web to provide essentially the same result.

In a preferred method embodiment of the invention, the present invention includes a method of creating a glass fiber facing sheet for engineered surfaces on products such as cement boards. According to this preferred embodiment, the melt blown polymer web is generally formed directly on the surface of the scrim and is preferably formed from an adhesive polymer composition which adheres to the surface of the scrim. In another preferred method embodiment, the present invention includes a method of making an engineered surface comprising providing a method of making an engineered surface comprising providing a facing sheet comprising an open mesh glass scrim defined by a plurality of intersecting, continuous filament glass yarns bonded at crossover points thereof and a melt blown polymer web joined to one face of the glass scrim and covering at least a portion of the mesh openings thereon, the opposed face of the glass scrim defining an exposed grid profile surface, integrating the exposed grid profile surface of the facing sheet into a surface portion of a cementitious slurry layer, and allowing the cementitious slurry layer to harden to form the engineered surface.

The present invention further includes a method of making a cement board using the glass fiber facing sheet of the invention. The glass fiber facing sheets can be used to prepare cement boards of various types using conventional cement board manufacturing apparatus and manufacturing layouts. The method comprises providing a first facing sheet, preferably formed of glass fibers, and depositing a first cementitious slurry onto and through the facing sheet. A second cementitious slurry typically varying in material composition and/or viscosity from the first cementitious slurry may optionally be deposited on the first cementitious slurry. A glass fiber facing sheet formed according to the method described above is then applied to the cementitious slurry with the exposed grid profile directly contacting the cementitious slurry. An additional cementitious slurry preferably having a low viscosity may optionally be applied to the surface of the glass fiber facing sheet. The cementitious slurry(s) and the glass fiber facing sheet(s) are then preferably pressed to control thickness and consolidate the materials and the cementitious material hardened, for example by heating, to mechanically integrate the exposed three-dimensional grid profile surface of the glass fiber facing sheet into the cementitious core thereby forming the cement board.

Cement boards including the glass fiber facing sheet of the present invention have a smooth finish with little or no pitting. In addition, these boards can be lighter and/or less expensive than conventional cement boards while possessing mechanical and physical properties comparable to or exceeding conventional boards.

BRIEF DESCRIPTION OF THE DRAWINGS

In the drawings which form a portion of the original disclosure of the invention.

DETAILED DESCRIPTION OF THE PREFERRED EMBODIMENTS

In the following detailed description, preferred embodiments of the invention are described and discussed in detail to enable practice of the invention. It will be apparent that although specific terms are used to describe the preferred embodiments, these are used in the descriptive sense and not for the purpose of limiting the invention thereto. It will also be apparent that the invention is susceptible to a wide variety of changes as will become apparent from a consideration of the preferred embodiments of the invention as shown in the attached drawings and described in detail below.

Figure 1:
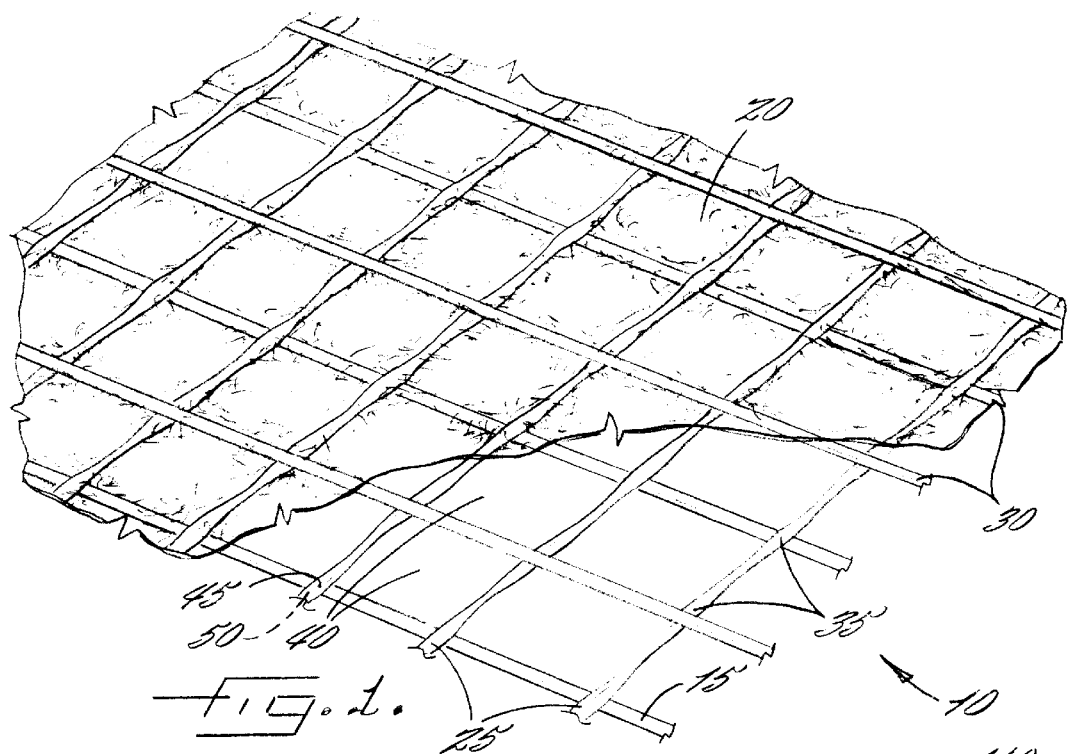
FIG. 1 illustrates a perspective view of one glass fiber facing sheet of the invention including a melt blown polymer web having a density of between about 2 and 30 g/m² according to a preferred embodiment of the invention.

FIG. 1 illustrates a glass fiber facing sheet 10 for an engineered surface such as cement board 12 according to one preferred embodiment of the invention. The glass fiber facing sheet 10 of the invention comprises an open mesh glass scrim 15 and a melt blown polymer web 20. The open mesh glass scrim 15 is formed by a plurality of intersecting, continuous multifilament, glass yarns 25 and 30 which are bonded at their crossover points 35 to provide dimensional stability to the glass scrim. Preferably, as shown in FIG. 1, the open mesh glass scrim is formed by a plurality of generally transverse glass yarns 25 and a plurality of generally longitudinal glass yarns 30 which are bonded at their crossover points 35 to provide dimensional stability to the glass scrim. As will be apparent, the glass scrim 15 can be formed from or include yarns of various orientations in place of or in addition to the generally transverse and generally longitudinal yarns illustrated in FIG. 1 including diagonally oriented yarns, randomly oriented yarns, and yarns in a 0°/60°/120° orientation, which intersect and are bonded at their crossover points and define a generally open mesh scrim. The scrim 15 can be woven, knitted or nonwoven. Preferably, scrims such as scrim 15 comprising transverse yarns 25 and the longitudinal yarns 30 are nonwoven. The glass scrim 15 can be formed by the apparatus and process of U.S. Pat. No. 4,242,779 issued Jan. 6, 1991 to Curinier et al. which is hereby incorporated by reference. This process involves using an apparatus for forming a web of transverse (weft) yarns 25 for use in the scrim 15 and subsequently superimposing one or more webs of longitudinal (warp) yarns 30 on the web of weft yarns to form the open mesh glass scrim.

Preferably, the quantity of glass yarns used to form the glass scrim 15 is minimal, thereby reducing the cost and the weight of the resulting cement board using the glass fiber facing sheet 10. Nevertheless, the amount of continuous glass yarns used in the glass scrim 15 are sufficient to impart the desired physical and mechanical properties to the scrim 15 and the glass fiber facing sheet 10. Therefore, scrims having generally transverse 25 and generally longitudinal yarns 30 are preferred. The amount of generally transverse yarns 25 and generally longitudinal yarns 30 may be defined by the "picks per inch" or pick count of the scrim 15. Alternatively, the number of transverse yarns 25 and longitudinal yarns 30 may be defined by the number of mesh openings 40 in the glass scrim 15. Preferably, the glass scrim 15 has less than about 100 mesh openings per square inch (i.e, a pick count of less than 10 by 10). More preferably, the glass scrim 15 has less than about 70 mesh openings per square inch or even less than about 50 mesh openings per square inch. Generally, the individual yarns used to form the scrim can have a size ranging from about 900 yds/lb to about 9,000 yds/lb.

The transverse yarns 25 and the longitudinal yarns 30 are bonded at their crossover points 35 to provide dimensional stability to the scrim 15 and therefore to the glass fiber facing sheet 10. Preferably, the transverse yarns 25 and the longitudinal yarns 30 are bonded at their crossover points 35 by a polymeric binder. The polymeric binder is preferably applied as a low viscosity coating so that it can uniformly penetrate into the transverse yarns 25 and longitudinal yarns 30 and coat the filaments forming the yarns. Numerous different polymeric binders capable of penetrating the transverse yarns 25 and the longitudinal yarns 30 and interlocking the transverse yarns and longitudinal yarns together at their crossover points 35 can be used in the invention. Preferably, the polymeric binder is an alkali and moisture resistant thermoplastic or thermosetting polymer coating which can, in addition to providing dimensional stability to the scrim, also prevent chemical interaction between the cementitious materials forming the core of the cement board and the glass filamentary material, particularly when an alkaline and/or silicious cementitious material, e.g. Portland cement, is contained in the core of the cement board. Exemplary moisture resistant materials for the polymeric binder include polyvinyl chloride, polyvinyl acetate, polyvinylidene chloride, polyvinyl alcohol, styrene butadiene rubber, urethane, silicone, metallic resinates, wax, asphalt, acrylic resins, styrene acrylate copolymers, aromatic isocyanates and diisocyanates, organohydrogenpolysiloxanes, thermoset resins such as epoxies and phenolics, mixtures thereof, and the like. The preferred polymeric binder for binding the transverse yarns 25 and the longitudinal yarns 30 is polyvinyl chloride (PVC) which is applied as a plastisol. Preferably, the polymer coating is applied to the scrim in between about 5 and 150 parts dry weight of resin to 100 parts by weight of fabric. In other words, the coating is applied at 5% to 150% dry weight pick-up.

A melt blown polymer web 20 is preferably joined to the glass scrim 15 on one face 45 of the scrim, but may be applied on both faces of the scrim. The melt blown polymer web 20 covers at least a portion of the mesh openings 40 in the glass scrim 15, preferably, a significant portion (e.g. most, if not all) of the mesh openings. The term "covers" as used in this context includes both partial and complete coverage of the mesh openings. The polymer web 20 is preferably composed of a plurality of randomly oriented melt blown polymer fibers. Preferably, the melt blown web partially and uniformly covers the mesh openings, i.e., each opening includes a porous web that only partially covers the scrim opening because of the openings in the porous web. The melt blown polymer fibers preferably are formed from an adhesive polymer so that the web adheres to the face 45 of the glass scrim 15 without requiring application of a separate adhesive layer. Therefore, the polymer used for the melt blown polymer web 20 is typically a polymer which possesses a certain tackiness to the glass surface or the polymeric binder, at least when the fibers are at a temperature above their softening point (e.g. 350° to 400° F.). Such materials include polyolefins such as polypropylene, polyethylene and amorphous poly($\alpha$-olefins); ethylene copolymers such as ethylene vinyl acetate or ethylene methacrylate copolymers, polyesters such as polyethylene terephthalate; polyamides; polyacrylates; polystyrene; styrene block copolymers; thermoplastic elastomers; mixtures thereof; and other known fiber forming thermoplastic materials. Preferably, the polymer used to form the melt blown polymer web 20 is not tacky at temperatures considerably below its softening point (e.g. at room temperature) to allow the facing sheet to be rolled and unrolled without sticking to itself, i.e., without adherence between the opposed face of the scrim and the melt blown polymer web. Preferred melt blown polymers include amorphous poly($\alpha$-olefin) polymers (e.g. 8494-36G from National Starch and Chemical Co.) and polyamides (e.g. HL-6520-X from HB Fuller Co.) The amount of melt blown fibers forming the polymer web 20 and applied to the face 45 of the glass scrim 15 is normally described in terms of basis weight, or grams of melt blown fibers per square meters of glass scrim surface. Preferably, the basis weight of the melt blown polymer web 20 is between about 1 and 100 g/m$^2$. In one preferred embodiment, illustrated in FIG. 1, the basis weight of the melt blown polymer web 20 is about 2 and 30 g/m$^2$.

The melt blown polymer webs 20 illustrated in FIG. 1 have very little inherent strength and are essentially nonstructural. Nevertheless, as described herein, the melt blown polymer web prevents pitting (i.e. indentations caused when the slurry used to form the cementitious core sinks into the mesh openings of the glass scrim). This is particularly a problem in the large open mesh glass scrims that are used in preferred embodiments of the present invention. The melt blown polymer web 20 maintains a portion of the cementitious slurry on the surface of the glass fiber facing sheet 10 and causes the slurry to "window pane" the mesh openings 40 of the glass scrim 15 thereby forming a substantially planar bridge surface between the transverse and longitudinal yarns 25 and 30. Accordingly, at least in some cases, the melt blown polymer web 20 increases the composite strength of the cement board 12 by improving the mechanical integration of the facing sheet 10 into the cement board 12.

Figure 2:
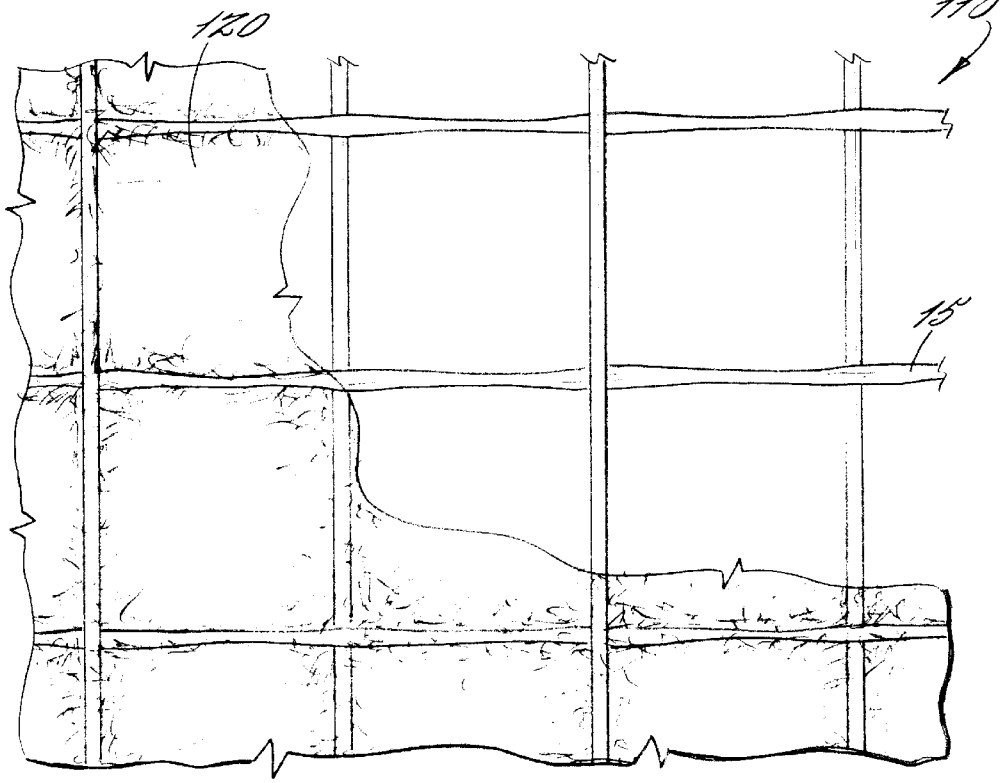
FIG. 2 illustrates a perspective view of one glass fiber facing sheet of the invention including a melt blown polymer web having a density of between about 10 and 50 g/m² according to an alternative preferred embodiment of the invention.

FIG. 2 illustrates a glass fiber facing sheet 110 according to an alternative preferred embodiment of the invention. In FIG. 2, the basis weight of the melt blown polymer web 120 is between about 10 and 50 g/m$^2$. The increased basis weight of the melt blown polymer web 120 over the embodiment illustrated in FIG. 1 provides a corresponding increase in the inherent strength of the web. Nevertheless, the majority of the strength provided by the facing sheet 110 in the cement board 12 is provided by the glass scrim 15. In the embodiment shown in FIG. 2, the higher basis weight melt blown polymer web 120, which by itself is relatively weak, combines with the cementitious slurry to provide various desirable surface properties including a smooth finished exterior surface which can be painted directly without requiring any additional material on the surface of the cement board.

Figure 3:
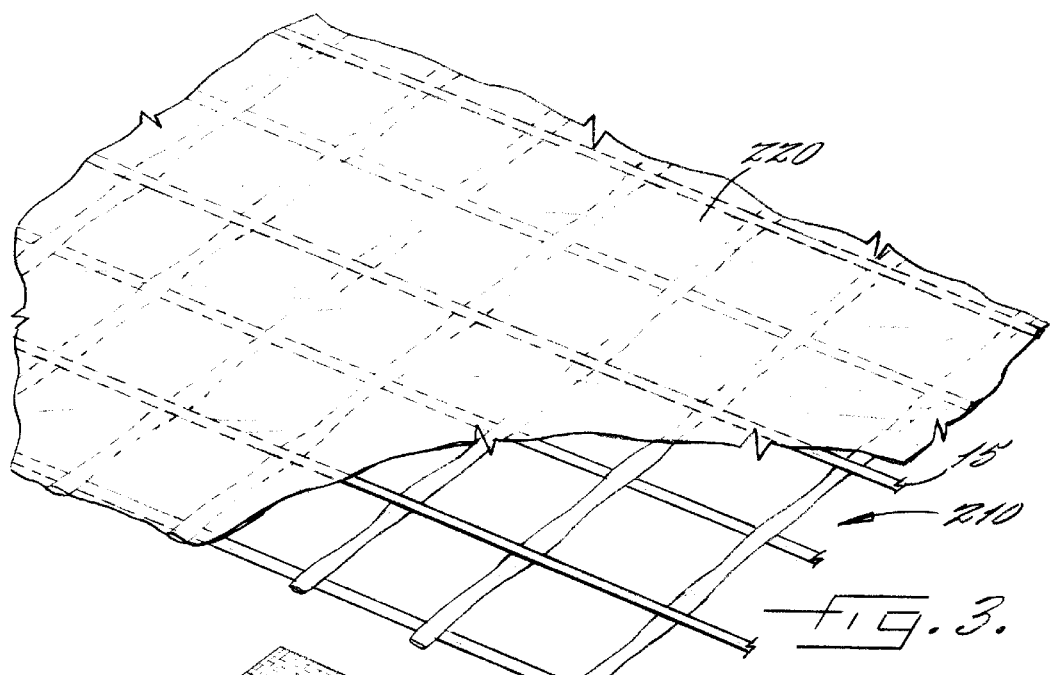
FIG. 3 illustrates a perspective view of one glass fiber facing sheet of the invention including a melt blown polymer web having a density of between about 45 and 75 g/m² and which has been melted to form a microporous film according to an alternative preferred embodiment of the invention.

FIG. 3 illustrates a glass fiber facing sheet 210 according to yet another embodiment of the invention. In FIG. 3, the melt blown polymer web 220 applied to the surface of the glass scrim 15 has an even higher basis weight of between about 45 and 75 g/m$^2$. As in FIG. 2, the increased basis weight over the embodiment illustrated in FIG. 1 does increase the inherent strength of the web 220 but the majority of the strength provided by the facing sheet 210 is still provided by glass scrim 15. The melt blown polymer web 220 may be subjected to heat and pressure to melt and coalesce the melt blown fibers in the polymer web to form a microporous layer 220. The microporous layer 220 provides a water resistant surface which nonetheless allows gases such as water vapor to pass through the facing sheet 210. The microporosity of the layer 220 can be particularly desirable in the formation of cement boards because the cement used in the core of the cement board is a hydrated compound and therefore water vapor may be evaporated from the hydrated cement. The microporous layer 220 allows the water vapor to pass through the glass scrim 15 thus preventing the buildup of moisture on the interior of the facing sheet 210 and the eventual corrosion of the cement board.

In the embodiments illustrated in FIGS. 1–3, the glass fiber facing sheet may additionally include a microporous film (not shown) either between the glass scrim 15 and the melt blown polymer web 20, 120, 220 or on top of the melt blown polymer web. The microporous layer provides all the benefits described with respect to the embodiment of FIG. 3. Suitable microporous films include the polymers described for use as melt blown polymer fibers. Preferably, the microporous layer is a microporous high density polyethylene film.

Figure 4:
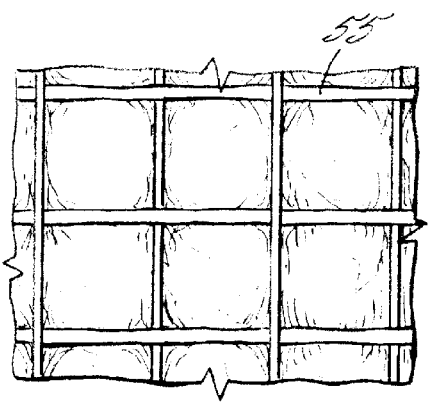
FIG. 4 illustrates a plan view of the glass fiber facing sheet in FIG. 1 taken from the bottom thereof and illustrates the exposed grid profile of the facing sheet.

As described above, the melt blown polymer web 20 is preferably applied to one face 45 of the glass scrim 15 to form the glass fiber facing sheet 10. The opposed face 50 of the glass scrim 15 is preferably not covered by the melt blown polymer web 20 and defines an exposed three-dimensional grid profile surface 55 as illustrated in FIG. 4. The grid profile surface 55 is available to interact mechanically with a cementitious slurry used in the cement board 12. As described below, this allows the glass fiber facing sheet 10 to be mechanically integrated into a surface portion of the cementitious core by virtue of the exposed grid profile surface 55 of the scrim 15.

The present invention also includes a method of making a glass fiber facing sheet 10 for an engineered surface such as the surface of cement board 12 according to the invention. First, the glass scrim 15 is created from a plurality of intersecting yarns such as generally transverse yarns 25 and generally longitudinal yarns 30. As stated above, the glass scrim 15 may include other yarn orientations. Typically, the scrim 15 is created by forming a web of weft yarns and then superimposing one or more webs of warp yarns as described in U.S. Pat. No. 4,242,779. Alternatively, the generally transverse yarns 25 and generally longitudinal yarns 30 can be woven or knitted to form the glass scrim 15. Once the glass scrim 15 is formed, the transverse yarns 25 and longitudinal yarns 30 are interlocked at their crossover points 35 to provide dimensional stability to the glass scrim 15. As described above, preferably this is accomplished by applying a polymer coating to the scrim 15. Generally, the glass scrim 15 is coated by the polymer coating by passing the glass scrim through a resinous bath containing the coating and then allowing the coating to harden on the surface and throughout the transverse yarns 25 and longitudinal yarns 30 of the glass scrim. Typically, the coating is hardened on the scrim 15 by heating the coated glass scrim to set the polymeric binder.

Once the glass scrim 15 is formed and coated with the polymeric binder, the melt blown polymer web 20 is preferably formed onto one face 45 of the glass scrim 15 to cover the mesh openings 40 thereon. This provides an exposed grid profile surface 55 on the opposed face of the glass scrim 15 for mechanical interaction with the cementitious composition of the cement board. The melt blown polymer web 20 can be formed onto the face 45 of the glass scrim 15 in an "on-line" process prior to taking the coated glass scrim up on rolls (e.g. roll 60 in FIG. 5) or alternatively, the melt blown polymer web can be formed on the face of the coated glass scrim 15 after it is taken up on rolls in an "off-line" process.

Figure 5:
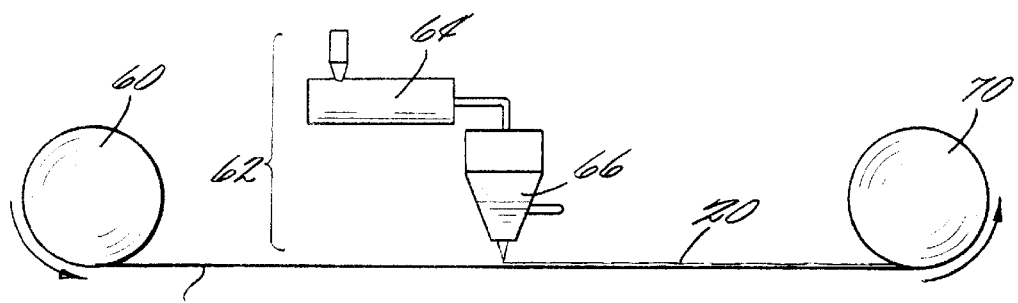
FIG. 5 schematically illustrates one preferred method of forming the melt blown polymer web on one face of the glass scrim to form a glass fiber facing sheet according to the invention.

FIG. 5 schematically illustrates the application of the melt blown polymer web 20 to the face 45 of the glass scrim 15 to form the glass fiber facing sheet 10 of the invention by forming a melt blown web directly on the glass scrim using a conventional melt blowing apparatus. Melt blowing apparatus are known to the skilled artisan and are disclosed, for example, in U.S. Pat. No. 3,849,241 to Buntin et al. and U.S. Pat. No. 4,048,364 to Harding et al. The melt blowing process involves supplying polymeric pellets or other polymer materials to a melting apparatus 64 such as an extruder, melting the molten polymeric material in the melting apparatus, and pumping it to melt blowing heads 66. The filamentary streams exit the heads 66 where high velocity converging streams of a heated gas, typically air, are supplied from nozzles. The converging streams of high velocity heated gas attenuate the polymer streams and deposit same on the surface of glass scrim 15. The fibers are randomly oriented and together form the melt blown polymer web 20. Once the melt blown polymer web 20 has been formed on the surface of the glass scrim 15, the web/scrim laminate constituting the facing sheet 10 of the invention, may be taken up on a collecting roll 70. Alternatively, the facing sheet 10 can be formed "on-line" in a process of forming an engineered surface such as cement board without being collected on rolls prior to use in forming the final product, e.g. cement board.

In the event that the melt blown polymer web 20 is to be melted to form a microporous layer 220 as described with respect to the embodiment in FIG. 3, the process of making the glass fiber facing sheet 10 can include a heater (not shown) or alternative means for melting and coalescing the melt blown fibers to form the microporous layer. Alternatively, if a separate microporous film is to be applied to the surface of the glass scrim 15 prior to applying the melt blown polymer web 20, then an additional melt blown apparatus and head (not shown) can be provided before the melt blowing apparatus 62 to form a light weight tacky web on the surface of the glass scrim 15 thereby allowing the microporous film to bond thereto. Additionally, it may be advantageous to apply a separate microporous layer on the melt blown polymer web, in which case, the additional melt blown apparatus and head would be provided after the melt blowing apparatus 62.

Figure 6:
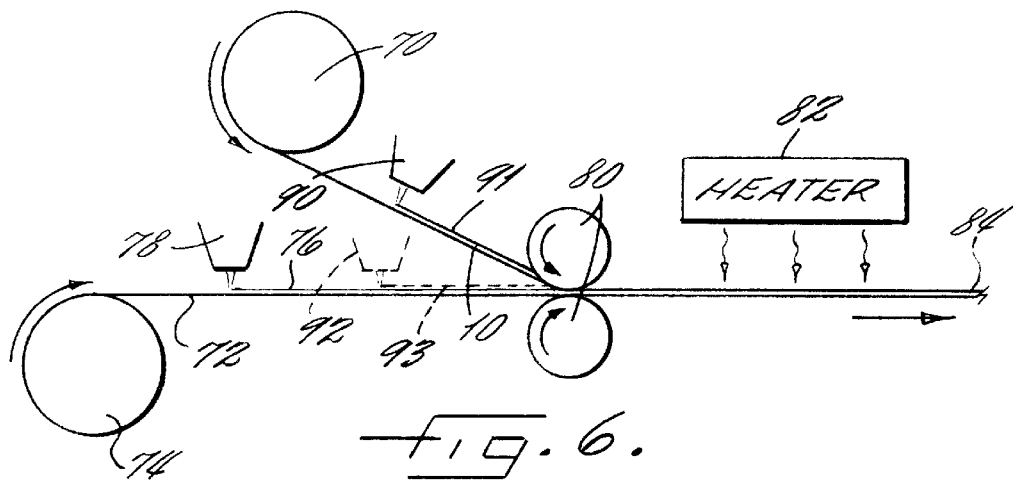
FIG. 6 schematically illustrates one preferred method of making a cement board including the glass fiber facing sheet of the invention.

FIG. 6 illustrates formation of a cement board 12 employing the glass fiber facing sheet 10 of the invention using conventional cement board manufacturing apparatus and layouts. As shown in FIG. 6, a first facing sheet 72 having any of various constructions is provided and the cement board 12 formed thereon. The first facing sheet 72 can, for example, be an open mesh glass scrim comprising a plurality of generally transverse yarns and generally longitudinal yarns optionally containing a melt blown polymer web as described above or any other material which can be used as a facing material for the cement board 12. The first facing sheet 72 is typically formed of glass fibers and supplied by a roll 74 or other suitable means and a first cementitious slurry 76 is provided from a mixer 78 and deposited onto the surface of the facing sheet 72. The cementitious slurry 76 can be formed of numerous different compositions of varying moisture content. Exemplary cementitious materials include hydraulic cements such as aluminous cement, Portland cement, gypsum cements, mixtures thereof with aggregates or polymer binders, and the like as will be known to the skilled artisan. Additional mixers such as mixer 92 can be installed between mixer 78 and pressing rolls 80 for the application of an additional cementitious material such as slurry 93 which may differ in viscosity and/or composition from the first cementitious slurry 76. Preferably, a second cementitious slurry 93 when used has a higher viscosity and generally contains larger aggregate particles than slurry 76.

As shown in FIG. 6, the glass fiber facing sheet 10 of the invention can be supplied from a roll 70 ("off-line") or formed on-line. An additional mixer 90 can be used to apply a low viscosity cementitious slurry 91 to facing sheet 10. The low viscosity slurry 91 will generally pass through the glass fiber facing sheet 10 but will also window pane over the mesh openings 40 to create a smooth surface on the cement board. The glass fiber facing sheet 10 is then applied to the cementitious slurry 76 (and optionally cementitious slurry 93) such that the exposed three dimensional grid profile surface 55 on the lower face 50 of the glass scrim 15 directly contacts the cementitious slurry(s). The glass fiber facing sheet 10, the cementitious slurry 76 or slurries and the facing sheet 72 are then pressed together such as by one or more pressing rolls 80, a doctor blade or any other suitable means. When the glass fiber facing sheet 10 is pressed into the cementitious slurry 76 or slurries, the cementitious slurry is forced up through the mesh openings 40 of the glass fiber facing sheet 10. The force of gravity then causes the cementitious slurry 76 to sink back down away from the glass fiber facing sheet 10 and form meniscuses within the mesh openings. Nevertheless, the melt blown polymer web 20 prevents the cementitious slurry 76 from sinking into the large mesh openings 40 of the glass fiber facing sheet 10. Instead, the melt blown polymer web 20 maintains a portion of the cementitious slurry 76 on the surface of the glass fiber facing sheet 10 and causes the slurry to window pane the mesh openings 40 of the glass scrim 15 thereby forming a substantially planar bridge surface between the transverse and longitudinal yarns, 25 and 30. As a result, the glass fiber facing sheet 10 becomes mechanically integrated into the cement board 12 once the cementitious slurry 76 or slurries harden to thereby provide a generally uniform planar exterior surface on the cement board 12.

In the hardening of the cementitious slurry 76 or slurries, the cementitious material becomes hydrated. This process can be accelerated by the application of heat such as from heater 82. During hardening of the slurry 76, the exposed three dimensional grid profile surface 55 of the glass fiber facing sheet 10 becomes mechanically interlocked into the cement board 12 since the grid profile surface allows the fluid slurry to intimately contact the filament yarns 25 and 30 forming the scrim 15 around a substantial portion of their cross-sections. Preferably the cementitious slurry 76 substantially fully surrounds the cross-section of the longitudinal and transverse yarns 25 and 30 to achieve a high level of mechanical integration of the facing sheet 10 into the core when the slurry hardens. Once the cement board is formed, it may be cut by appropriate means 84 into boards such as 4'×8'×7/16" boards. The resulting cement board is illustrated in FIG. 7.

Figure 7:
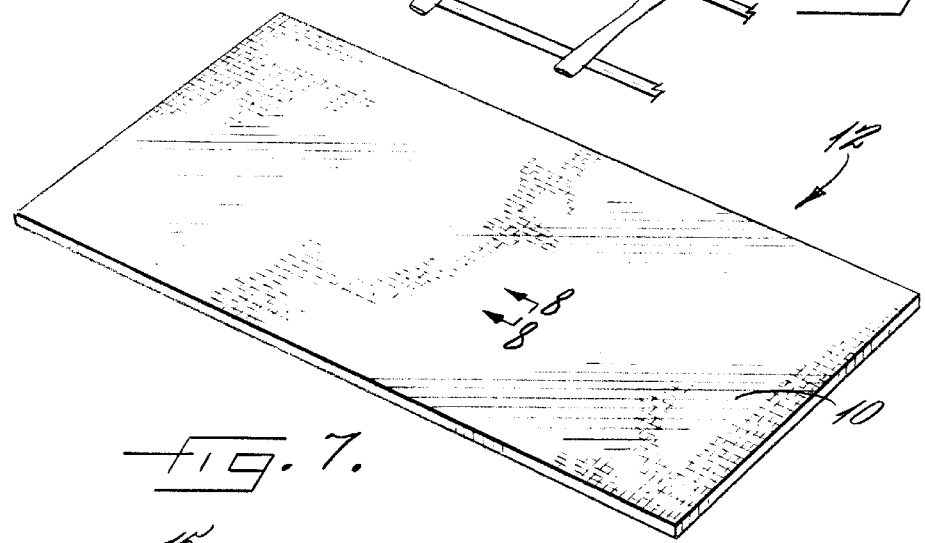
FIG. 7 illustrates a perspective view of a cement board including a glass fiber facing sheet of the invention.
Figure 8:
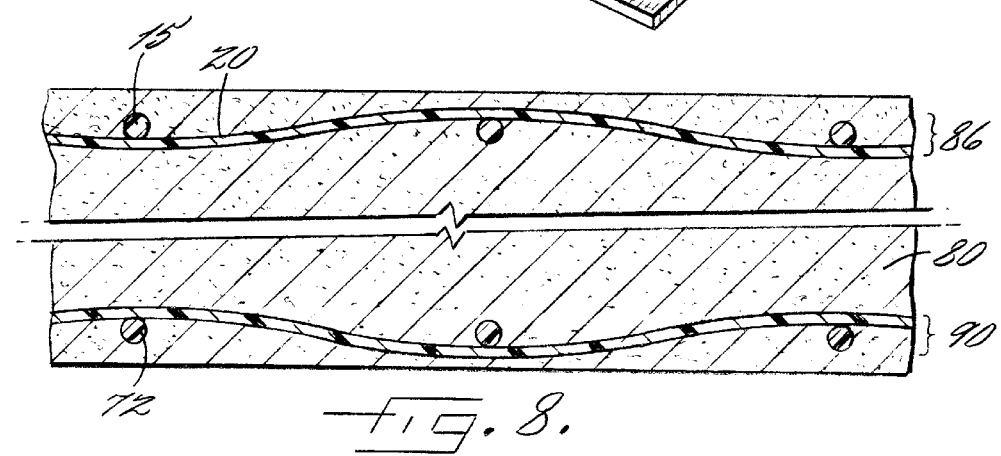
FIG. 8 is a sectional view of the cement board in FIG. 7 along line 8—8.

FIG. 8 illustrates a cross-section of the cement board 12 illustrated in FIG. 7 along line 8—8. As shown in FIG. 8, the glass fiber facing sheet 10 comprising the glass scrim 15 and the melt blown polymer web 20 is mechanically integrated into a surface portion 86 of the cementitious core 80 forming the cement board. In addition, the facing sheet 72 is mechanically integrated into an opposed surface portion 90 of the cementitious core 80.

As will be apparent from the foregoing, the glass fiber facing sheet 10 of the present invention provides a smooth cement board 12 which is essentially free of pitting. The glass fiber facing sheet 10 can be constructed using fewer continuous glass yarns per unit length of the scrim fabric, thus reducing the cost of the resulting cement board 12 but without negatively affecting the physical and mechanical properties of the cement board.

The cement boards including the glass fiber facing sheet of the invention can be used in a wide variety of indoor and outdoor structural application. For example, cement boards are used as a support surface for overlying materials such as wood siding, stucco, synthetic stucco, aluminum, brick, tile, stone aggregate and marble. In addition, cement boards are used in exterior insulating systems, commercial roof deck systems, and exterior curtain walls. In addition to cement boards, the facing sheet of the invention can be used with other engineered surfaces in masonry applications, roofing applications and the like.

The invention has been described in considerable detail with particular reference to preferred embodiments. However, numerous variations and modifications can be made without departing from the spirit and scope of the invention as described in the foregoing specification and shown in the drawings and defined in the following claims.

That which is claimed is:

1. A facing sheet for an engineered surface comprising:
   an open mesh glass scrim having a plurality of intersecting yarns bonded at their crossover points to provide dimensional stability to said scrim; and
   a melt blown polymer web joined to said glass scrim on one face of said scrim and covering at least a portion of the mesh openings therein; and
   the opposed face of said glass scrim defining an exposed grid profile for mechanical interaction with a cementitious composition.

2. The facing sheet according to claim 1 wherein said scrim is nonwoven.

3. The facing sheet according to claim 1 wherein the yarns in said scrim are bonded at their crossover points by a polymeric binder.

4. The facing sheet according to claim 3 wherein the polymeric binder is polyvinyl chloride.

5. The facing sheet according to claim 1 wherein the basis weight of said melt blown polymer web is between about 2 and 30 g/m$^2$.

6. The facing sheet according to claim 1 wherein the basis weight of said melt blown polymer web is between about 10 and 50 g/m$^2$.

7. The facing sheet according to claim 1 wherein the basis weight of said melt blown polymer web is between about 45 and 75 g/m$^2$.

8. The facing sheet according to claim 7 wherein said melt blown polymer web forms a microporous layer.

9. The facing sheet according to claim 1 further comprising a microporous layer.

10. The facing sheet according to claim 9 wherein said microporous layer comprises a material selected from the group consisting of polyethylene, nylon, polypropylene and ethylene copolymer films.

11. The facing sheet according to claim 9 wherein said microporous layer is between said glass scrim and said melt blown polymer web and thereby promotes adhesion between said melt blown polymer web and said glass scrim.

12. The facing sheet according to claim 9 wherein said microporous layer is located on said melt blown polymer web opposite said glass scrim.

13. The facing sheet according to claim 1 wherein said glass scrim comprising a plurality of generally transverse and generally longitudinal yarns.

14. The facing sheet according to claim 13 wherein said scrim has less than about 100 mesh openings per square inch.

15. The facing sheet according to claim 13 wherein said scrim has less than about 70 mesh openings per square inch.

16. The facing sheet according to claim 1 wherein said melt blown polymer web consists of a material which is tacky at a temperature above its softening point to facilitate adhesion between said melt blown polymer web and said glass scrim but which is essentially free of tackiness at temperatures considerably below its softening point to thereby allow said facing sheet to be rolled and unrolled without adherence between said opposed face and said melt blown polymer web.

17. The facing sheet according to claim 1 wherein said melt blown polymer web comprises a polymer selected from the group consisting of polyolefins ethylene copolymers, polyesters, polyamides, polyacrylates, polystyrene, styrene block copolymers, thermoplastic elastomers, and mixtures thereof.

18. The facing sheet according to claim 17 wherein said melt blown polymer web comprises an amorphous poly($\alpha$-olefin) polymer.

19. The facing sheet according to claim 1 wherein said melt blown polymer web comprises a polyamide.

20. A facing sheet for a cement board comprising:

an open mesh glass scrim having a plurality of generally transverse and generally longitudinal yarns bonded at their crossover points with a polymeric binder to provide dimensional stability; and a melt blown polymer web joined to said glass scrim on one face of said scrim and covering at least a portion of the mesh openings therein;

the opposed face of said glass scrim defining an exposed grid profile for mechanical interaction with a cementitious composition of the cement board.

21. An engineered surface comprising:

a facing sheet comprising an open mesh glass scrim having a plurality of intersecting yarns bonded at their crossover points to provide dimensional stability and a melt blown polymer web joined to said glass scrim on one face of said scrim and covering at least a portion of the mesh openings therein such that the opposed face of said glass scrim defines an exposed grid profile; and a cementitious material having a surface portion mechanically integrated with the exposed grid profile of said glass scrim.

22. A cement board comprising:

a first facing sheet comprising an open mesh glass scrim having a plurality of intersecting yarns bonded at their crossover points and a melt blown polymer web joined to said glass scrim on one face of said scrim and covering at least a portion of the mesh openings therein, the opposed face of said glass scrim defining an exposed grid profile surface for mechanical interaction with the cementitious composition forming the cementitious core of said cement board; and a cementitious core having a surface portion mechanically integrated with the grid profile surface of the opposed face of the glass scrim in said first facing sheet.

23. The cement board according to claim 22 further comprising a second facing sheet joined to said cementitious core opposite said first facing sheet.

24. The cement board according to claim 23 wherein the second facing sheet is an open mesh glass scrim mechanically integrated with an opposed surface portion of said cementitious core.

25. The cement board according to claim 24 further comprising the second facing sheet further comprises a melt blown polymer web joined to said glass scrim on one face of said scrim and uniformly covering at least a portion of the mesh openings therein.

26. The cement board according to claim 24 wherein the open mesh glass scrim comprises a plurality of generally transverse and generally longitudinal yarns bonded at crossover points thereof.

27. The cement board according to claim 22 wherein the melt blown polymer web provides a substantially smooth exterior surface to said cement board.

28. The cement board according to claim 22 wherein said cementitious core comprises a material selected from the group consisting of hydraulic cement and gypsum cement.

29. The cement board according to claim 22 wherein the scrim in said first facing sheet is a nonwoven scrim.

30. The cement board according to claim 22 wherein the yarns in the glass scrim in said first facing sheet are bonded at their crossover points by a polymeric binder.

31. The cement board according to claim 22 wherein the basis weight of the melt blown polymer web in said first facing sheet is between about 2 and 30 g/m$^2$.

32. The cement board according to claim 22 wherein the basis weight of the melt blown polymer web in said first facing sheet is between about 10 and 50 g/m$^2$.

33. The cement board according to claim 22 wherein the basis weight of the melt blown polymer web in said first facing sheet is between about 45 and 75 g/m$^2$.

34. The cement board according to claim 22 wherein the glass scrim of said first facing sheet comprises a plurality of generally transverse and generally longitudinal yarns.

35. The cement board according to claim 34 wherein the scrim in said first facing sheet comprises less than about 100 mesh openings per square inch.

36. The cement board according to claim 34 wherein the scrim in said first facing sheet comprises less than about 70 mesh openings per square inch.

* * * * *